United States Patent
Otana

(10) Patent No.: US 10,377,146 B2
(45) Date of Patent: Aug. 13, 2019

(54) IMAGE FORMING APPARATUS

(71) Applicant: KYOCERA Document Solutions Inc., Osaka-shi, Osaka (JP)

(72) Inventor: Aiichiro Otana, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/751,560

(22) PCT Filed: Jul. 13, 2016

(86) PCT No.: PCT/JP2016/070627
§ 371 (c)(1),
(2) Date: Feb. 9, 2018

(87) PCT Pub. No.: WO2017/026221
PCT Pub. Date: Feb. 16, 2017

(65) Prior Publication Data
US 2018/0236779 A1    Aug. 23, 2018

(30) Foreign Application Priority Data

Aug. 11, 2015 (JP) .................... 2015-158720

(51) Int. Cl.
*B41J 2/47* (2006.01)
*G02B 26/12* (2006.01)
(Continued)

(52) U.S. Cl.
CPC . *B41J 2/47* (2013.01); *B41J 2/44* (2013.01); *G02B 26/12* (2013.01); *G03G 15/01* (2013.01);
(Continued)

(58) Field of Classification Search
CPC .......... G03G 2215/0158; G03G 15/20; G03G 21/20; B41J 2/44; B41J 2/47
See application file for complete search history.

(56) References Cited

U.S. PATENT DOCUMENTS 7,817,929 B2 * 10/2010 Booth ................ G03G 15/0266
347/116
8,270,857 B2 * 9/2012 Saitou ................ G03G 15/0131
399/301
(Continued)

FOREIGN PATENT DOCUMENTS

JP            5103349 B2    10/2012

OTHER PUBLICATIONS

European Patent Office, Supplementary European Search Report Issued in Application No. 16834918.1, dated Jul. 17, 2018, Germany, 7 pages.

*Primary Examiner* — John Zimmermann
(74) *Attorney, Agent, or Firm* — Alleman Hall Creasman & Tuttle LLP

(57) ABSTRACT

An image forming apparatus includes: a housing in which a light source, a laser scanning member, a light detecting portion configured to detect light incident on a predetermined position in a scanning path of the light scanned by the laser scanning member, and a scanning lens configured to cause the light scanned by the laser scanning member to be scanned at an equal speed on an image carrier, are disposed; a temperature gradient detecting portion, configured to detect a temperature gradient of the housing, a heater configured to heat the image carrier or a sheet; and a correction processing portion configured to correct the emission start timing based on the temperature detected by the temperature gradient detecting portion, and a predetermined expression, and change content of the expression based on (Continued)

an operation state of the heater at a start of an image formation process.

8 Claims, 7 Drawing Sheets

(51) Int. Cl.
    *G03G 15/01*     (2006.01)
    *B41J 2/44*     (2006.01)
    *G03G 15/04*     (2006.01)
    *G03G 21/14*     (2006.01)
    *G03G 15/043*     (2006.01)
    *G03G 21/20*     (2006.01)

(52) U.S. Cl.
    CPC ........... *G03G 15/011* (2013.01); *G03G 15/04* (2013.01); *G03G 15/043* (2013.01); *G03G 21/14* (2013.01); *G03G 21/20* (2013.01); *G03G 2215/00084* (2013.01); *G03G 2215/0158* (2013.01)

(56) References Cited

U.S. PATENT DOCUMENTS

| | | | |
|---|---|---|---|
| 2003/0052105 A1* | 3/2003 | Nagano | B23K 26/0604 219/121.83 |
| 2007/0196561 A1* | 8/2007 | Philippi | B29C 64/153 427/8 |
| 2014/0064800 A1 | 3/2014 | Sato et al. | |
| 2015/0301471 A1* | 10/2015 | Nakahata | G03G 15/0189 347/116 |
| 2017/0259504 A1* | 9/2017 | Lin | B23K 26/12 |

* cited by examiner

FIG. 6

| ELAPSED TIME t1 (MIN) | DETECTED COLOR SHIFT AMOUNT d2 (PX) | SCANNING LENS TEMPERATURE T1 (°C) | LIGHT DETECTING PORTION TEMPERATURE T2 (°C) | CALCULATED COLOR SHIFT AMOUNT d1 (PX) | POST-CORRECTION COLOR SHIFT AMOUNT d3 (PX) |
|---|---|---|---|---|---|
| 0 | 0.00 | 25 | 23 | – | – |
| 1 | 0.50 | 26 | 24 | 1.00 | −0.50 |
| 2 | 0.80 | 27 | 24 | 1.45 | −0.65 |
| 3 | 0.90 | 28 | 25 | 1.35 | −0.45 |
| 4 | 1.00 | 28 | 25 | 1.35 | −0.35 |
| 5 | 1.00 | 29 | 26 | 1.25 | −0.25 |
| 6 | 1.00 | 29 | 26 | 1.25 | −0.25 |
| 7 | 1.20 | 30 | 26 | 1.70 | −0.50 |
| 8 | 1.10 | 30 | 27 | 1.15 | −0.05 |
| 9 | 1.20 | 30 | 27 | 1.15 | 0.05 |
| 10 | 1.25 | 31 | 27 | 1.60 | −0.35 |
| 11 | 1.30 | 31 | 28 | 1.05 | 0.25 |
| 12 | 1.40 | 32 | 28 | 1.50 | −0.10 |
| 13 | 1.50 | 32 | 28 | 1.50 | 0.00 |
| 14 | 1.40 | 32 | 28 | 1.50 | −0.10 |
| 15 | 1.70 | 33 | 29 | 1.40 | 0.30 |
| 16 | 1.70 | 33 | 29 | 1.40 | 0.30 |
| 17 | 2.00 | 33 | 29 | 1.40 | 0.60 |
| 18 | 1.80 | 33 | 29 | 1.40 | 0.40 |
| 28 | 0.80 | 30 | 29 | 0.05 | 0.75 |
| 38 | 0.30 | 31 | 30 | −0.05 | 0.35 |
| 48 | 0.10 | 31 | 30 | −0.05 | 0.15 |
| 78 | −0.50 | 31 | 30 | −0.05 | −0.45 |
| 108 | −0.70 | 31 | 31 | −0.60 | −0.10 |
| 138 | −0.80 | 32 | 31 | −0.15 | −0.65 |
| 168 | −0.70 | 32 | 31 | −0.15 | −0.55 |
| 198 | −0.90 | 32 | 31 | −0.15 | −0.75 |

IMAGE FORMING APPARATUS

TECHNICAL FIELD

The present invention relates to an electrophotographic image forming apparatus.

BACKGROUND ART

In a tandem-type image forming apparatus including a plurality of image forming units, a so-called color shift may occur in which relative positions of toner images of different colors formed on image carriers of the image forming units are shifted in a scanning direction (main scanning direction) of light irradiated from a laser scanning device to the image carriers. For example, in this type of image forming apparatus, the color shift may occur due to expansion and contraction of optical members that are caused by the temperature change in the apparatus. As a result, a color shift correction for correcting the color shift may be executed in the image forming apparatus. In particular, a color shift correction using different correction tables for a temperature increase and a temperature decrease in the image forming apparatus may be executed (see, for example, PTL 1).

CITATION LIST

Patent Literature

[PTL 1] Japanese Patent No. 5103349

SUMMARY OF THE INVENTION

Problems to be Solved by the Invention

However, there is a problem that the storage capacity of a storage portion, such as a ROM, mounted on the image forming apparatus increases since correction tables corresponding to situations, such as a temperature increase and a temperature decrease, require a large amount of data.

The present invention has been made in view of such conventional circumstances, and it is an object of the present invention to provide an image forming apparatus that can correct positional shifts in the main scanning direction of the scanning light with high accuracy, without using individual correction tables corresponding to situations.

Solution to the Problems

An image forming apparatus according to an aspect of the present invention includes a light source, a laser scanning member, a light detecting portion, a light source control portion, a scanning lens, a housing, a temperature gradient detecting portion, a heater, and a correction processing portion. The laser scanning member scans light emitted from the light source. The light detecting portion detects light incident on a predetermined position in a scanning path of the light scanned by the laser scanning member. The light source control portion, each time the light detecting portion detects light, causes the light source to emit light corresponding to image data of a line, at a predetermined emission start timing. The scanning lens causes the light scanned by the laser scanning member to be scanned at an equal speed on an image carrier. The laser scanning member, the light detecting portion, and the scanning lens are disposed in the housing. The temperature gradient detecting portion detects a temperature gradient of the housing. The heater heats the image carrier or a sheet before image transferring. The correction processing portion corrects the emission start timing based on the temperature gradient detected by the temperature detecting portion, the ambient temperature detected by the ambient temperature detecting portion, and a predetermined expression, and change content of the expression based on an operation state of the heater at a start of an image formation process.

Advantageous Effects of the Invention

According to the present invention, it is possible to provide an image forming apparatus that can correct positional shifts in the main scanning direction of the scanning light with high accuracy, without using individual correction tables corresponding to situations.

BRIEF DESCRIPTION OF THE DRAWINGS

FIG. 6 is a diagram showing a setting method of an expression used in the image forming apparatus according to the embodiment of the present invention.

DESCRIPTION OF EMBODIMENTS

The following describes an embodiment of the present invention with reference to the accompanying drawings for the understanding of the invention. It should be noted that the following embodiment is an example of a specific embodiment of the present invention and should not limit the technical scope of the present invention.

Figure 1:
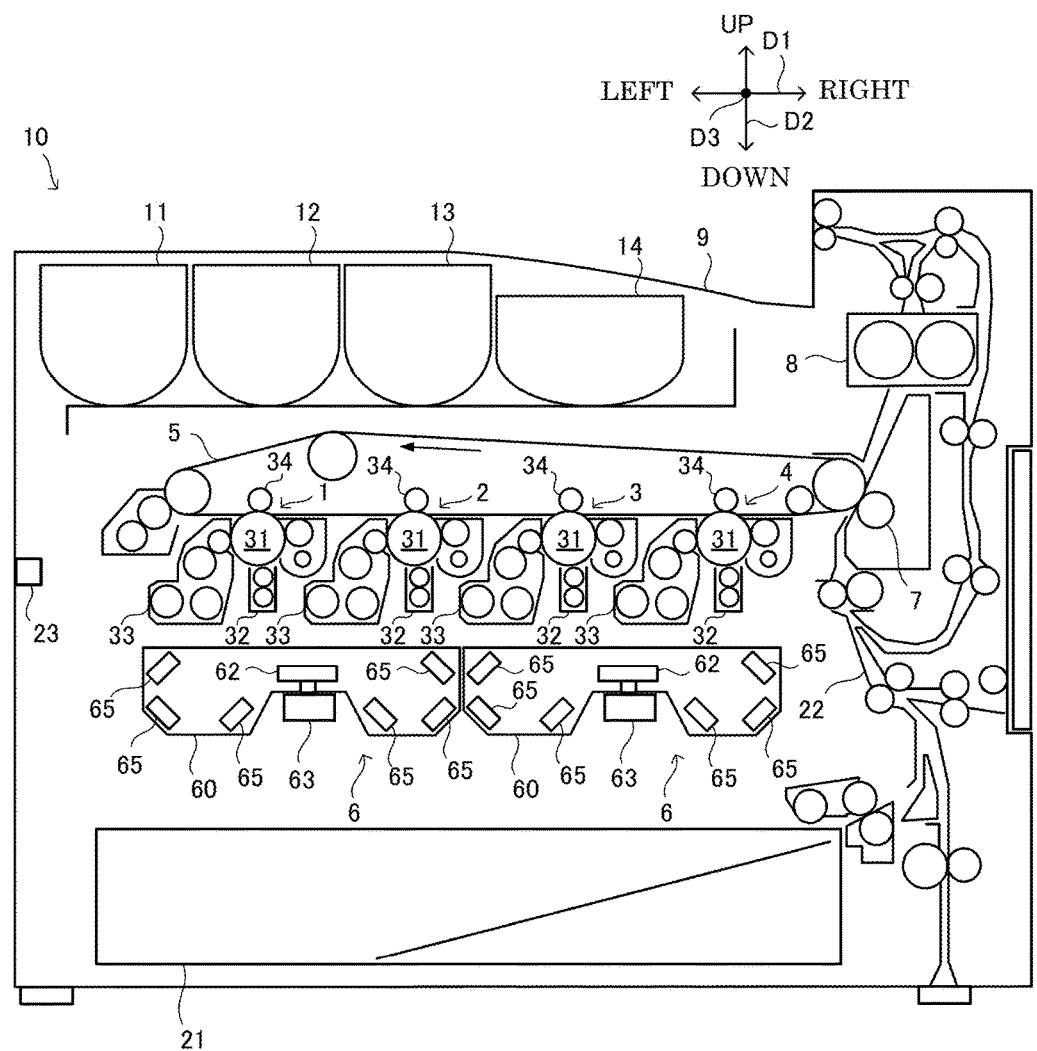
FIG. 1 is a diagram showing a configuration of an image forming apparatus according to an embodiment of the present invention.

As shown in FIG. 1, an image forming apparatus 10 includes a plurality of image forming units 1-4, an intermediate transfer belt 5, a laser scanning device 6, a secondary transfer roller 7, a fixing device 8, a sheet discharge tray 9, toner containers 11-14, a sheet feed cassette 21, a conveyance path 22, and an ambient temperature detecting portion 23. The image forming apparatus 10 is a printer that forms a color or monochrome image on a sheet supplied along the conveyance path 22 from the sheet feed cassette 21, and discharges the sheet with the image to the sheet discharge tray 9. It is noted that in the following description, an explanation may be given with reference to a left-right direction D1, an up-down direction D2, and a front-rear direction D3 defined in the drawings.

In the present embodiment, the image forming apparatus 10 includes two laser scanning devices 6 in correspondence with the image forming units 1-4. On the other hand, as other embodiments, a configuration where four laser scanning devices are provided in correspondence with the image forming units 1-4, and a configuration where one laser scanning device is provided in correspondence with the image forming units 1-4, are considered. In addition, the image forming apparatus according to the present invention is not limited to a printer, but may be a facsimile, a copier, or a multifunction peripheral, for example.

The image forming units 1-4 are arranged in alignment along the intermediate transfer belt 5, and constitute a so-called tandem-type image forming portion. Specifically, the image forming units 1-4 form toner images corresponding to colors of Y (yellow), C (cyan), M (magenta), and K (black). Each of the image forming units 1-4 is an electrophotographic image forming unit that includes a photoconductor drum 31 (an example of the image carrier), a charging portion 32, a developing portion 33, and a primary transfer roller 34.

In each of the image forming units 1-4, after the photoconductor drum 31 is charged by the charging portion 32, an electrostatic latent image corresponding to image data is formed on the photoconductor drum 31 by light irradiated from the laser scanning device 6. Subsequently, toner images formed on the photoconductor drums 31 are sequentially transferred to the intermediate transfer belt 5 by the primary transfer rollers 34. This allows a color or monochrome toner image to be formed on the intermediate transfer belt 5. Thereafter, the toner image on the intermediate transfer belt 5 is transferred to a sheet by the secondary transfer roller 7, and the toner image is fused by the fixing device 8 to as to be fixed to the sheet.

Meanwhile, in a case where an a-Si (amorphous silicon)-based material is used in the photoconductor drum 31, a so-called "image deletion" may occur in which the electrostatic latent image is disturbed by water molecules that have adhered to the surface of the photoconductor drum 31 due to increase in humidity. As a result, each of the image forming units 1-4 includes a heater 35 (see FIG. 3) configured to heat the photoconductor drum 31. The heater 35 is, for example, a planar heater in which resistance elements are arranged on a substrate, and is provided in the vicinity of the photoconductor drum 31 so as to heat the photoconductor drum 31. In the image forming apparatus 10, a control portion 100 that is described below, has a heater function to heat the photoconductor drum 31 by using the heater 35 such that the water molecules of the photoconductor drum 31 are evaporated and removed before an image formation process is started. For example, the heater 35 is operated in a predetermined situation such as when the image forming apparatus 10 is resumed from a power saving mode, or when the image forming apparatus 10 is powered on. It is noted that the control portion 100 can switch between enabling and disabling the heater function in response to a user operation.

The ambient temperature detecting portion 23 is a thermistor or the like that is provided inside or outside of the image forming apparatus 10, and is used to detect an ambient temperature of a place where the image forming apparatus 10 is installed. For example, the ambient temperature detecting portion 23 is provided in the vicinity of an air intake port that allows inside and outside of the image forming apparatus 10 to communicate with each other, and detects the temperature of the outside air as the ambient temperature.

Figure 2:
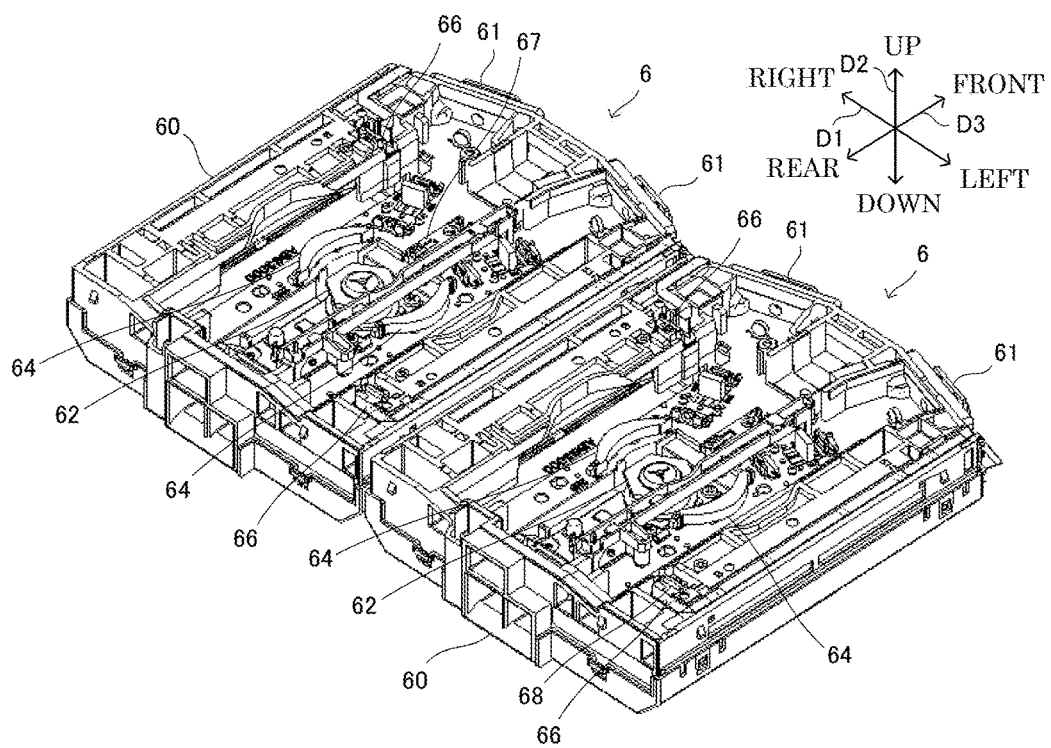
FIG. 2 is a diagram showing a configuration of a laser scanning device according to the embodiment of the present invention.

Next, the laser scanning devices 6 are described. The laser scanning devices 6 form electrostatic latent images corresponding to image data on the surfaces of the photoconductor drums 31 by scanning laser beams on the surfaces of the photoconductor drums 31. Specifically, as shown in FIG. 1 and FIG. 2, each of the laser scanning devices 6 includes light sources 61, a polygon mirror 62, a motor 63, fθ lenses 64, reflection mirrors 65, light detecting portions 66, and a housing 60 in which these components are disposed. In addition, a first temperature detecting portion 67 is provided in one of the two laser scanning devices 6, and a second temperature detecting portion 68 is provided in the other of the two laser scanning devices 6. It is noted that although a cover member is attached to an upper surface of the housing 60 of each of the laser scanning devices 6, in FIG. 2, the cover member is omitted.

The light sources 61 are, for example, laser diodes that irradiate laser beams. The polygon mirrors 62 are rotary polygon mirrors that each have six reflection surfaces for reflecting two laser beams emitted from the two light sources 61, and are axially supported by the motors 63 in a rotatable manner. It is noted that the polygon mirrors 62 are an example of the laser scanning member. The motors 63 are an example of the driving portion that rotationally drives the polygon mirrors 62. Upon being rotationally driven by the motor 63, each polygon mirror 62 scans, in different directions, the two laser beams emitted from the two light sources 61. In the following, scanning directions of the laser beams scanned by the polygon mirrors 62 are referred to as a main scanning direction (a direction parallel to the front-rear direction D3 in FIG. 2), and a direction orthogonal to the main scanning direction above the surface of each photoconductor drum 31 is referred to as a sub scanning direction.

The fθ lenses 64 are scanning lenses that cause the laser beams scanned by the polygon mirrors 62 in the main scanning direction, to be focused on the surfaces of the photoconductor drums 31 that are irradiation objects, and to be scanned at an equal speed. The four fθ lenses 64 shown in FIG. 2 are, from left to right of FIG. 2, scanning lenses that correspond to the four image forming units 1-4 for yellow, cyan, magenta, and black, respectively.

The reflection mirrors 65 are reflection members that are elongated in the main scanning direction in which the laser beams are scanned by the polygon mirrors 62. The reflection mirrors 65 are supported by the housings 60 at opposite ends thereof in the longitudinal direction. The reflection mirrors 65 sequentially reflect laser beams that have passed through the fθ lenses 64, and guide the laser beams to the surfaces of the photoconductor drums 31.

The light detecting portions 66 are provided in correspondence with the image forming units 1-4 and disposed at predetermined positions on the scanning paths of the laser beams scanned by the polygon mirrors 62 in the main scanning direction so as to detect incident laser beams. For example, the light detecting portions 66 are provided in the vicinities of corners of the housing 60. In the image forming apparatus 10, the control portion 100 described below controls emission start timing of emitting a laser beam corresponding to image data of each line, namely, a writing timing of writing an image of each line, based on a detection timing at which the light detecting portion 66 detects a laser beam. It is noted that as another embodiment, one light detecting portion 66 may be provided in correspondence with one of the image forming units 1-4. In addition, as a further embodiment, one light detecting portion 66 may be provided in correspondence with the image forming units 1 and 2, and one light detecting portion 66 may be provided in correspondence with the image forming units 3 and 4.

The first temperature detecting portion 67 is included in, among the two laser scanning devices 6, an laser scanning device 6 that is on the right side and corresponds to black and magenta. The first temperature detecting portion 67 is a thermistor or the like that is used to detect the temperature of the fθ lenses 64. In addition, the second temperature detecting portion 68 is included in, among the two laser scanning devices 6, an laser scanning device 6 that is on the left side and corresponds to cyan and yellow. The second temperature detecting portion 68 is a thermistor or the like that is used to detect the temperature of the light detecting portions 66. For example, as shown in FIG. 2, the first temperature detecting portion 67 is disposed in the vicinity of the center of the housing 60, and the second temperature detecting portion 68 is disposed in the vicinity of a corner of the housing 60. That is, the first temperature detecting portion 67 and the second temperature detecting portion 68 are disposed to be separate from each other by a predetermined distance in the housings 60, and temperatures detected by the first temperature detecting portion 67 and the second temperature detecting portion 68 can be used as an index of the temperature gradient of the housings 60. In the present embodiment, the first temperature detecting portion 67 and the second temperature detecting portion 68 are an example of the temperature gradient detecting portion configured to detect the temperature gradient of the housings 60.

Meanwhile, in the image forming apparatus 10, a so-called color shift may occur in which relative positions of toner images of respective colors formed on the photoconductor drums 31 of the image forming units 1-4 are shifted in the main scanning direction due to expansion and contraction of the optical members, such as the fθ lenses 64, that are caused by the temperature change in the apparatus. On the other hand, in the image forming apparatus 10, a color shift correction is executed in which the color shift is corrected based on the temperatures detected by the first temperature detecting portion 67 and the second temperature detecting portion 68. In particular, as described below, in the image forming apparatus 10, positional shifts of scanning light beams in the main scanning direction are corrected without using individual correction tables corresponding to situations. In addition, the temperature gradient of the housings 60 may change differently depending on the ambient temperature of a place where the image forming apparatus 10 is installed, or the surrounding temperature of the laser scanning devices 6 in the image forming apparatus 10. In that case, the amount of color shift of the laser beams in the main scanning direction that occurs in the image formation process, may change. As a result, in the image forming apparatus 10, the color shift of the laser beams in the main scanning direction is corrected by taking into consideration the change of color shift amount that is caused by, for example, the ambient temperature of a place where the image forming apparatus 10 is installed, or the surrounding temperature of the laser scanning devices 6 in the image forming apparatus 10.

Figure 3:
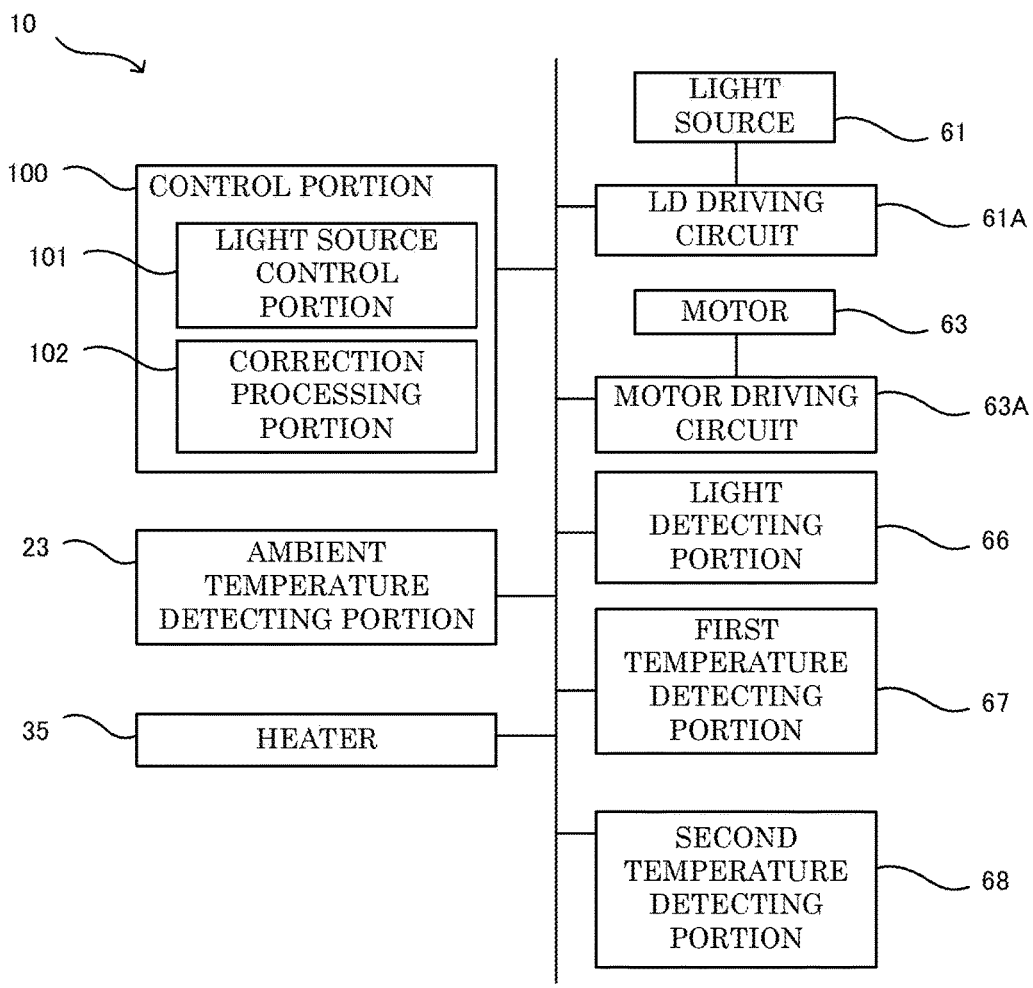
FIG. 3 is a block diagram showing a system configuration of the image forming apparatus according to the embodiment of the present invention.

Specifically, as shown in FIG. 3, the image forming apparatus 10 includes the control portion 100 that controls the image forming operation in the image forming apparatus 10. It is noted that the control portion 100 may be a main control portion that comprehensively controls the whole image forming apparatus 10, or may be provided independently of the main control portion. The control portion 100 is connected with an LD driving circuit 61A, a motor driving circuit 63A, the light detecting portions 66, the first temperature detecting portion 67, and the second temperature detecting portion 68. The LD driving circuit 61A is configured to cause the light sources 61 to emit light, and the motor driving circuit 63A is configured to control the rotation of the motors 63.

The control portion 100 includes a CPU, a ROM, a RAM, and an EEPROM™. In addition, the control portion 100 includes a light source control portion 101 and a correction processing portion 102. Specifically, the control portion 100 functions as the light source control portion 101 and the correction processing portion 102 by causing the CPU to execute processes in accordance with control programs stored in the ROM or the like. It is noted that the light source control portion 101 and the correction processing portion 102 may be configured as electric circuits.

Each time the light detecting portion 66 of any of the image forming units 1-4 detects a laser beam, the light source control portion 101 causes the light source 61 corresponding to the image forming unit to emit light corresponding to image data of a line at a predetermined emission start timing. For example, when the light detecting portion 66 of the image forming unit 1 detects a laser beam, the light source control portion 101 causes the light source 61 corresponding to the image forming unit 1 to emit a laser beam corresponding to image data of one line after a predetermined time elapses since the detection. That is, in each of the image forming units 1-4, a timing to write an image on the photoconductor drum 31 in the main scanning direction is determined by a timing at which a laser beam is detected by the light detecting portion 66.

The correction processing portion 102 corrects the emission start timing based on the temperatures detected by the first temperature detecting portion 67 and the second temperature detecting portion 68, the ambient temperature detected by the ambient temperature detecting portion 23, and a predetermined expression. Specifically, the correction processing portion 102 calculates a shift amount of the emission start timing based on a change of the temperature detected by the first temperature detecting portion 67, a difference between the temperatures detected by the first temperature detecting portion 67 and the second temperature detecting portion 68 (temperature gradient), and the ambient temperature detected by the ambient temperature detecting portion 23, and corrects the emission start timing based on the calculated shift amount. It is noted that the difference between the temperatures detected by the first temperature detecting portion 67 and the second temperature detecting portion 68 is used as an index of the temperature gradient of the housings 60.

In addition, the correction processing portion 102 changes the content of the expression based on the operation state of the heater 35 at the start of the image formation process. Specifically, in a case where the heater 35 had been operated before the start of the image formation process, the ambient temperature of the laser scanning devices 6 is higher than a case where the heater 35 had not been operated. As a result, in a case where the heater 35 had been operated before the start of the image formation process, the correction processing portion 102 changes the content of the expression so that a correction amount of the emission start timing becomes smaller than a case where the heater 35 had not been operated.

In the present embodiment, a shift amount of a toner image formed by the image forming unit 3 for magenta with reference to a predetermined toner image formed by the image forming unit 4 for black is calculated as the shift amount of the emission start timing. Here, it is considered that the housings 60 are similarly deformed due to temperature changes in the two laser scanning devices 6 of the image forming apparatus 10. As a result, it can be assumed that a shift amount of toner images of magenta and black is equal to a shift amount of a toner image formed by the image forming unit 1 for yellow with reference to a toner image formed by the image forming unit 2 for cyan. Accordingly, the correction processing portion 102 realizes a color shift correction by changing the emission start timings of the image forming units 1 and 3 with reference to the image forming units 2 and 4, based on the calculated shift amount of the emission start timing.

The expression is represented by the following equation (1), wherein T0 denotes a temperature detected by the first temperature detecting portion 67 at a predetermined reference time, T1 denotes a current temperature detected by the first temperature detecting portion 67, T2 denotes a current temperature detected by the second temperature detecting portion 68, T3 denotes a current temperature detected by the ambient temperature detecting portion 23, d1 denotes a calculated color shift amount that is the shift amount of the emission start timing, and K1, K2 and A1 denote predetermined coefficients.

$$d1 = A1/T3 * (K1*(T1-T2) + K2*(T1-T0)) \quad (1)$$

It is noted that the expression may be the following equation (2). It is noted that a coefficient A2 is a predetermined coefficient, and may be the same value as the coefficient A1 or a different value from the coefficient A1.

$$d1 = 1/T3 * (A1*K1*(T1-T2) + A2*K2*(T1-T0)) \quad (2)$$

The reference time is a time at which a color shift correction process called a color registration is executed by the control portion 100 when, for example, the image forming apparatus 10 is powered on, or the image forming apparatus 10 is resumed from a power saving mode. In the color shift correction process, for example, a predetermined toner image is actually formed on the intermediate transfer belt 5 by using the image forming units 1-4, and a color shift amount is detected by using a density sensor or the like, and then the emission start timing of each of the image forming units 1-4 is changed based on the color shift amount. That is, the temperature T0 is stored in the RAM of the control portion 100 or the like, as a set value that indicates a temperature that was detected by the first temperature detecting portion 67 when a color shift had not been generated, and is deleted when, for example, the image forming apparatus 10 is powered off or transitions to the power saving mode.

Figure 4:
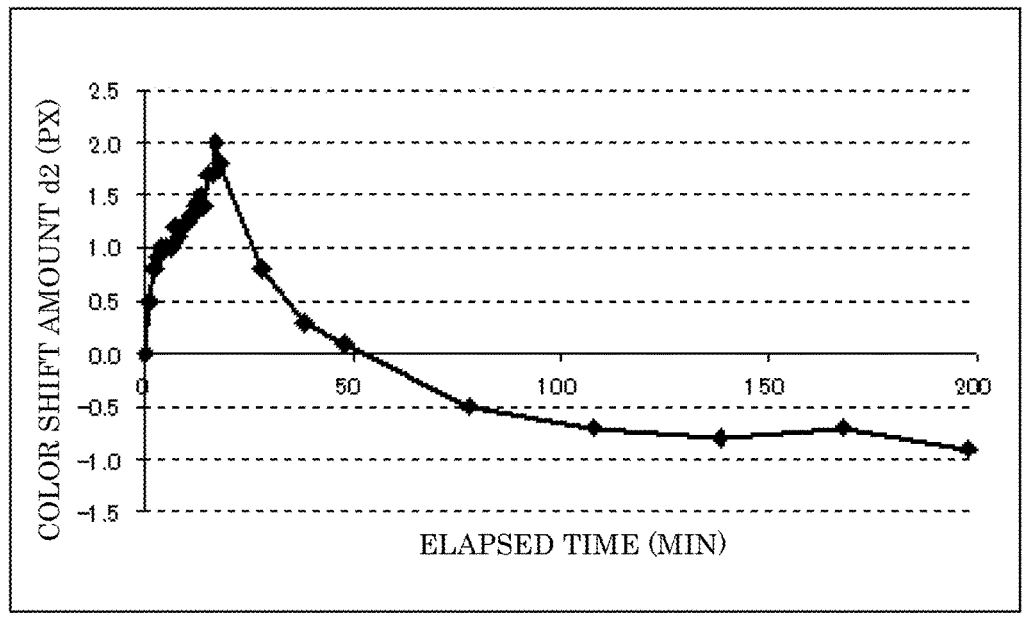
FIG. 4 is a diagram showing a setting method of an expression used in the image forming apparatus according to the embodiment of the present invention.
Figure 5:
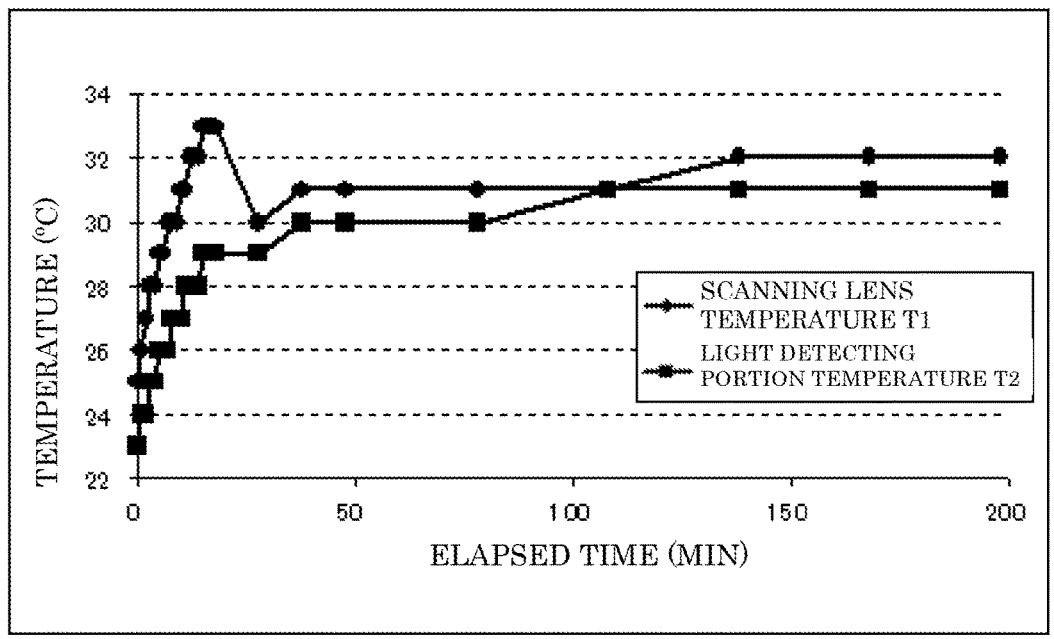
FIG. 5 is a diagram showing a setting method of an expression used in the image forming apparatus according to the embodiment of the present invention.

In addition, the coefficients K1 and K2 included in the expression are constants that are set in advance based on an experiment or a simulation. Here, an example of a method for setting the coefficients K1 and K2 is described with reference to FIG. 4 to FIG. 6. FIG. 4 to FIG. 6 show a detected color shift amount d2 and the temperatures T1 and T2 detected by the first temperature detecting portion 67 and the second temperature detecting portion 68, wherein the detected color shift amount d2 indicates a color shift amount that was actually measured when printing had been executed intermittently after printing had been executed continuously for 18 minutes by the image forming apparatus 10.

In addition, FIG. 6 shows a calculated color shift amount d1 and a post-correction color shift amount d3, the calculated color shift amount d1 being calculated by substituting the temperatures T1 and T2 detected by the first temperature detecting portion 67 and the second temperature detecting portion 68 for the equation (1), the post-correction color shift amount d3 indicating a difference (d2−d1) between the calculated color shift amount d1 and the detected color shift amount d2. The post-correction color shift amount d3 represents a value of a color shift amount that remains after a color shift correction is performed based on the calculated color shift amount d1.

The table of FIG. 6 shows data of a spreadsheet program created to reference calculation results obtained from the equation (1). The spreadsheet program is configured to automatically calculate and display the calculated color shift amount d1 and the post-correction color shift amount d3 upon input of arbitrary values of the coefficients K1 and K2.

Specifically, FIG. 6 shows a calculation result for a case where the coefficient K1 was set to "0.55", and the coefficient K2 was set to "−0.10". The values of the coefficients K1 and K2 were obtained as a result of searching for the coefficients K1 and K2 that make the difference between the calculated color shift amount d1 and the detected color shift amount d2 smallest, while changing values of the coefficients K1 and K2 by using the data of the spreadsheet program shown in FIG. 6. That is, when the coefficients K1 and K2 have these values, the post-correction color shift amount d3 has its smallest value. In the image forming apparatus 10, the values of the coefficients K1 and K2 that make the difference between the calculated color shift amount d1 and the detected color shift amount d2 smallest, are set for each model of the image forming apparatus 10 in advance and stored in the ROM of the control portion 100 or the like.

In particular, in the image forming apparatus 10, the values of the coefficients K1 and K2 are set in advance for each of different situations: a situation where the heater 35 had been operated before the start of the image formation process; and a situation where the heater 35 had not been operated before the start of the image formation process. Specifically, coefficients K11 and K12 are set as values of the coefficients K1 and K2 that correspond to the case where the heater 35 had been operated before the start of the image formation process. In addition, coefficients K21 and K22 are set as values of the coefficients K1 and K2 that correspond to the case where the heater 35 had not been operated before the start of the image formation process. For example, in a case where the temperature gradient of the housings 60 during execution of the image formation process is gentler when the heater 35 had been operated than when the heater 35 had not been operated, the housings 60 have been deformed by a small amount, and it is required to correct the emission start timing only by a small amount. As a result, in the present embodiment, the coefficient K11 is smaller than the coefficient K21, and the coefficient K12 is smaller than the coefficient K22.

Furthermore, the expression includes the ambient temperature T3, and the correction amount of the emission start timing changes depending on the ambient temperature T3. Specifically, according to the expression, the higher the ambient temperature T3 is, the smaller the amount of correction of the emission start timing by the correction processing portion 102 is; and the lower the ambient temperature T3 is, the larger the amount of correction of the emission start timing by the correction processing portion 102 is. In addition, the coefficients A1 and A2 are set in advance to allow the ambient temperature T3 to be reflected in the calculation of the calculated color shift amount d1, and the degree of influence of the ambient temperature T3 on the calculated color shift amount d1 changes depending on the values of the coefficients A1 and A2.

[Image Formation Control Process]

Figure 7:
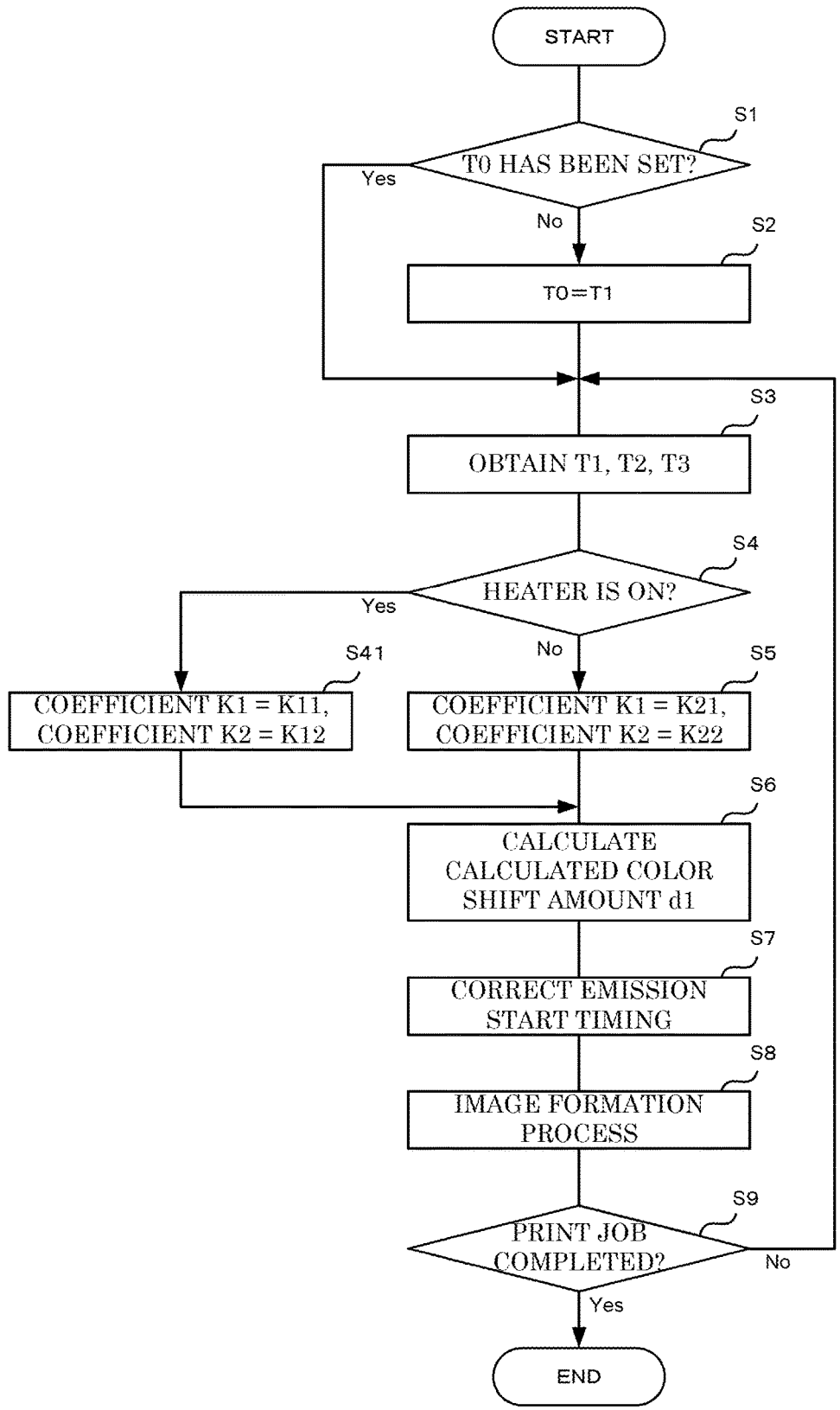
FIG. 7 is a flowchart showing an example of a procedure of an image formation control process executed in the image forming apparatus according to the embodiment of the present invention.

Next, an image formation control process that is executed by the control portion 100 in the image forming apparatus 10, is described with reference to FIG. 7. It is noted that the control portion 100 executes the image formation control process when, for example, a print job is received from an external information processing apparatus such as a personal computer.

<Step S1>

In step S1, the control portion 100 determines whether or not a temperature detected by the first temperature detecting portion 67 while the color registration was executed in the image forming apparatus 10, has been set as the temperature T0. Here, when it is determined that the temperature T0 has not been set (S1; No), the process moves to step S2, and when it is determined that the temperature T0 has been set (S1; Yes), the process moves to step S3.

<Step S2>

In step S2, the control portion 100 obtains the temperature T1 of the scanning lenses 64 by using the first temperature detecting portion 67, and sets the temperature T1 as the temperature T0. That is, in this case, the reference time corresponding to the temperature T0 in the expression is the start time of the image formation process. With this configuration, even before the color registration is executed, the color shift correction is performed by taking into consideration a temperature rise that is caused due to execution of the image formation process, based on the current temperatures, and the color shift is restricted.

<Step S3>

In step S3, the control portion 100 obtains the current temperature T1 of the scanning lenses 64, the current temperature T2 of the light detecting portions 66, and the ambient temperature T3 by using the first temperature detecting portion 67, the second temperature detecting portion 68, and the ambient temperature detecting portion 23. The temperatures T1 and T2 gradually increase during execution of the image formation process in the image forming apparatus 10, and gradually decrease after the image formation.

<Step S4>

In step S4, the control portion 100 determines whether or not the heater 35 had been operated before the start of the image formation process. Here, when it is determined that the heater 35 had been operated (S4: Yes), the process moves to step S41, and when it is determined that the heater 35 had not been operated (S4: No), the process moves to step S5. For example, in the image forming apparatus 10, in a case where the heater function has been set to an effective state, the heater 35 is operated before the start of the image formation process, and in a case where the heater function has been set to an ineffective state, the heater 35 is not operated before the start of the image formation process. As a result, in step S4, it may be determined whether or not the heater 35 had been operated before the start of the image formation process, based on whether the heater function has been set to the effective state or to the ineffective state. In addition, in step S4, it may be determined whether or not the heater 35 had been operated over a predetermined time period immediately before the start of the image formation process. The predetermined time period is a time period that is set in advance as an index for determining whether or not the temperature has increased by the heating operation of the heater 35 to a temperature at which it is appropriate to use the coefficients K21 and K22 in the expression.

It is noted that in the present embodiment, the heater 35 is taken as an example of a heater that influences change of the ambient temperature of the laser scanning devices 6. On the other hand, the heater 35 may be, for example, a heater that is used in the sheet feed cassette 21 or the sheet feed portion 22 to heat a sheet before image transferring. In this case, the heater 35 is disposed, for example, between the laser scanning devices 6 and the sheet feed cassette 21. It is noted that in a case where both a heater 35 for heating the photoconductor drums 31 and a heater 35 for heating a sheet before image transferring are provided, it may be determined in step S4 whether or not at least one of the heaters 35 had been operated.

<Step S41>

In step S41, the control portion 100 sets the coefficient K1 that is used in the expression, to the coefficient K11, and sets the coefficient K2 to the coefficient K12. It is noted that as another embodiment, only one of the coefficient K1 and the coefficient K2 may be changed.

<Step S5>

On the other hand, in step S5, the control portion 100 sets the coefficient K1 that is used in the expression, to the coefficient K21, and sets the coefficient K2 to the coefficient K22. It is noted that as another embodiment, only one of the coefficient K1 and the coefficient K2 may be changed.

As described above, in the image formation control process, the control portion 100 changes a correction amount of the emission start timing by changing the content of the expression, namely, changing the values of the coefficients K1 and K2 depending on the operation state of the heater 35 at the start of the image forming process. It is noted that this process is executed by the correction processing portion 102 of the control portion 100. This allows the calculated color shift amount d1 to be calculated with a high accuracy from the expression by taking into consideration the ambient temperature of the laser scanning devices 6 that changes depending on the operation state of the heater 35 at the start of the image forming process, and the correction accuracy of the emission start timing is increased.

<Step S6>

In step S6, the control portion 100 calculates the calculated color shift amount d1 based on the temperatures T1 and T2 obtained from the first temperature detecting portion 67 and the second temperature detecting portion 68, the ambient temperature T3 obtained from the ambient temperature detecting portion 23, and the expression represented by the equation (1). This makes it possible to obtain an assumed value of a color shift amount that is generated when a color image is formed by the image forming units 1-4 at the current point in time.

<Step S7>

In step S7, the control portion 100 corrects the emission start timing in each of the image forming units 1-4 based on the calculated color shift amount d1 calculated in the step S6. It is noted that this process is executed by the correction processing portion 102 of the control portion 100. Specifically, in the present embodiment, the correction processing portion 102 corrects the emission start timings of the image forming units 1 and 3 among the image forming units 1-4, based on the calculated color shift amount d1. It is noted that the emission start timing is defined by an elapsed time since detection of a laser beam by the light detecting portions 66.

<Step S8>

In step S8, the control portion 100 executes the image forming process once (for one sheet) in the print job by using the image forming units 1-4, based on the emission start timing corrected in the step S7. More specifically, the image forming process includes a process in which, each time the light detecting portion 66 detects a laser beam, the control portion 100 causes the light source 61 to emit, at the emission start timing, light corresponding to image data of a line. It is noted that this process is executed by the light source control portion 101 of the control portion 100.

<Step S9>

In step S9, the control portion 100 determines whether or not the print job is completed. Here, until the print job is completed (S9: No), the process is returned to the step S3, and when the print job is completed (S9: Yes), the color shift correction process is ended. That is, the correction of the emission start timing performed in the steps S3 to S7 is executed each time the image forming process is performed once during the execution of the print job. It is noted that as another embodiment, the processes of the steps S3 to S7 may be executed each time the image forming process is performed a predetermined number of times such as several times to several tens of times (several sheets to several tens of sheets).

As described above, in the image forming apparatus 10, even in a case where the temperature in the image forming apparatus 10 gradually increases during execution of a print job, a color shift is restricted by a color shift correction based on the expression, without executing the color registration by interrupting the image forming process in the middle of the print job. In addition, in a case where a print job is executed while the temperature in the image forming apparatus 10 gradually decreases after execution of a print job, a color shift is restricted since a color shift correction is performed based on the expression, without executing the color registration.

In the image forming apparatus 10, the calculated color shift amount d1 is calculated based on the temperatures T1 and T2 detected by the first temperature detecting portion 67 and the second temperature detecting portion 68, and the expression represented by the equation (1), and the color shift correction is executed based on the calculated color shift amount d1. As a result, positional shifts of the scanning light beams in the main scanning direction are corrected with high accuracy, without using individual correction tables corresponding to situations such as a temperature increase and a temperature decrease. In addition, in the image forming apparatus 10, a change of the color shift amount that is generated by the ambient temperature T3 of a place where the image forming apparatus 10 is installed and the operation state of the heater 35 (the ambient temperature of the laser scanning devices 6), is taken into consideration. As a result, a positional shift of a scanning light beam in the main scanning direction is corrected with higher accuracy.

Figure 8:
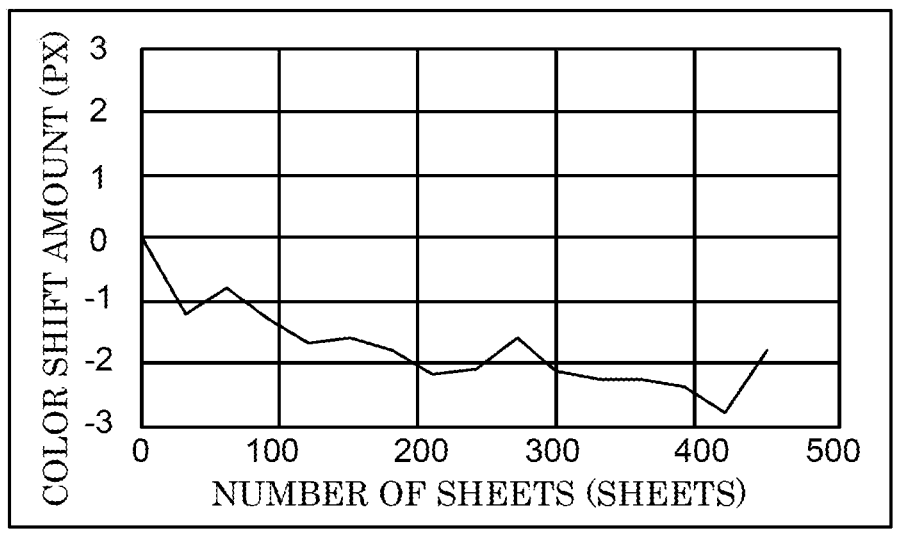
FIG. 8 is a diagram showing an execution result of the image formation control process in the image forming apparatus according to the embodiment of the present invention.
Figure 9:
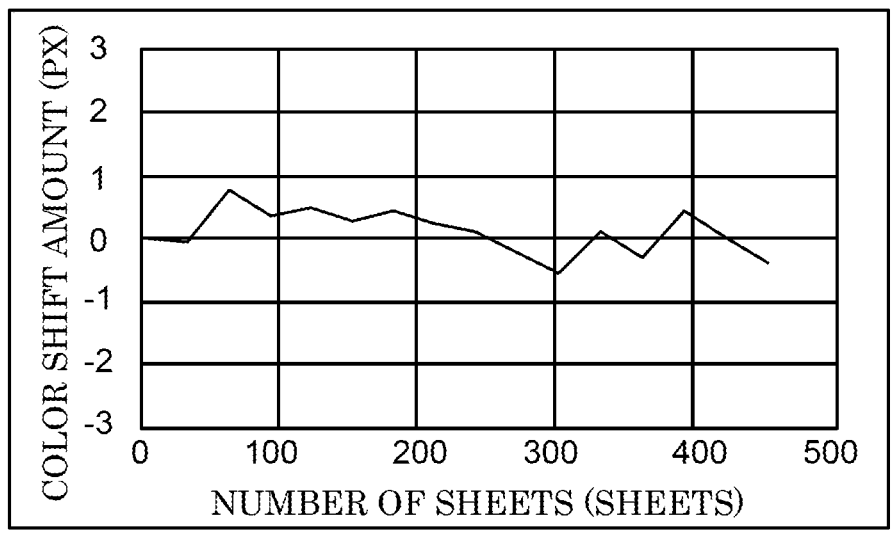
FIG. 9 is a diagram showing an execution result of the image formation control process in the image forming apparatus according to the embodiment of the present invention.

FIG. 8 shows an amount of color shift of a magenta image from a black image in a case where the color shift correction process had not been executed by the correction processing portion 102 in the image forming apparatus 10. On the other hand, FIG. 9 shows an amount of color shift of a magenta image from a black image in a case where the color shift correction process had been executed by the correction processing portion 102 in the image forming apparatus 10. It is noted that the color shift amounts shown in FIG. 8 and FIG. 9 are average values of color shift amounts at a left end, a center, and a right end in the main scanning direction. As shown in FIG. 8, in the case where the color shift correction process had not been executed, a color shift of approximately three pixels occurred at maximum. On the other hand, as shown in FIG. 9, in the case where the color shift correction process had been executed, the color shift was restricted to approximately less than one pixel.

In addition, in the present embodiment, the first temperature detecting portion 67 is provided in one of the two laser scanning devices 6, and the second temperature detecting portion 68 is provided in the other. That is, each of the laser scanning devices 6 is provided with one temperature detecting portion. With this configuration, it is possible to mount a common circuit board on the laser scanning devices 6. It is noted that the circuit board is common to a circuit board on which the light sources 61 are mounted, or common to a circuit board on which the driving circuit of the motor 63 is mounted.

As another embodiment, in the two laser scanning devices 6, a plurality of first temperature detecting portions 67 may be provided in correspondence with a plurality of fθ lenses 64, and a plurality of second temperature detecting portions 68 may be provided in correspondence with a plurality of light detecting portions 66. In this case, for example, the coefficients K1 and K2 in the equation (1) may be provided individually in correspondence with the image forming units 1-4, and the correction processing portion 102 may calculate the color shift amounts of the image forming units 1-4 individually based on the first temperature detecting portions 67 and the second temperature detecting portions 68 that respectively correspond to the image forming units 1-4. In addition, the correction processing portion 102 may realize the color shift correction by changing the emission start timing for each of the image forming units 1-4. With this configuration, the color shift correction with a higher accuracy is realized than a case where one first temperature detecting portion 67 and one second temperature detecting portion 68 are provided.

Meanwhile, the positions of the first temperature detecting portion 67 and the second temperature detecting portion 68 described in the present embodiment are not limited to the positions shown in FIG. 2 as far as they are in the vicinities of the fθ lenses 64 and the light detecting portions 66. For example, the first temperature detecting portion 67 may be located at another position as far as the position is suited for detection of the temperature of the fθ lenses 64. For example, the first temperature detecting portion 67 may be located at a position that is opposite to the polygon mirrors 62 when viewed from the fθ lenses 64 and does not interfere with the laser beams. This allows the first temperature detecting portion 67 to detect the temperature of the fθ lenses 64 at a position where it is hardly influenced by the heat of the polygon mirrors 62. As a further example, the first temperature detecting portion 67 may be disposed at a position that is between the polygon mirror 62 and the fθ lens 64 and does not interfere with the laser beams.

In addition, the present embodiment describes a case where the second temperature detecting portion 68 detects the temperature of the light detecting portions 66. On the other hand, the laser scanning device 6 may be provided with a reflection mirror for detection that reflects light incident on a predetermined position in the scanning path of light scanned by the polygon mirror 62, toward the light detecting portion 66. In this case, the second temperature detecting portion 68 may be disposed at a position where it can detect the temperature of the reflection mirror for detection, and the temperature of the reflection mirror for detection may be used in place of the temperature of the light detecting portion 66.

Furthermore, the temperature detected by the first temperature detecting portion 67 is not limited to the temperature of the fθ lenses 64. Specifically, the first temperature detecting portion 67 and the second temperature detecting portion 68 may be disposed at any positions as far as the temperature gradient of the housings 60 of the laser scanning devices 6 can be detected. For example, the first temperature detecting portion 67 and the second temperature detecting portion 68 may be disposed at separate positions such as a vicinity of a center and a vicinity of an outer circumference of the laser scanning devices 6. Furthermore, with regard to each of the first temperature detecting portion 67 and the second temperature detecting portion 68, the number thereof is not limited to one, but may be two or more. That is, the first temperature detecting portion 67 or the second temperature detecting portion 68 may be disposed at three or more separate positions in the laser scanning device 6.

According to the present embodiment, the correction processing portion 102 changes the content of correction depending on both the ambient temperature T3 and the operation state of the heater 35. On the other hand, as another example, the correction processing portion 102 may change the content of correction depending on either the ambient temperature T3 or the operation state of the heater 35. For example, the steps S4, S41, and S5 may be omitted, and the coefficient K1 and the coefficient K2 may be set to be constant. In addition, in step S6, the calculated color shift amount d1 may be calculated based on the following equation (3) in which the ambient temperature T3 is not taken into consideration.

$$d1 = K1*(T1-T2) + K2*(T1-T0) \qquad (3)$$

Furthermore, the ambient temperature of the laser scanning devices 6 changes depending on the length of heating time period during which the heater 35 had been operated before the start of the image formation process. Thus, as another embodiment, the length of heating time period may be reflected on the result of the expression. For example, in step S6, the calculated color shift amount d1 may be calculated based on the following equation (4) or equation (5). It is noted that t1 denotes the length of heating time period during which the heater 35 had been operated before the start of the image formation process, and B1 and B2 denote predetermined coefficients.

$$d1 = B1/t1*(K1*(T1-T2) + K2*(T1-T0)) \qquad (4)$$

$$d1 = 1/t1*(B1*K1*(T1-T2) + B2*K2*(T1-T0)) \qquad (5)$$

The invention claimed is:

1. An image forming apparatus comprising:
a light source;
a laser scanning member configured to scan light emitted from the light source;
a light detecting portion configured to detect light incident on a predetermined position in a scanning path of the light scanned by the laser scanning member;
a light source control portion configured to, each time the light detecting portion detects light, cause the light source to emit light corresponding to image data of a line, at a predetermined emission start timing;
a scanning lens configured to cause the light scanned by the laser scanning member to be scanned at an equal speed on an image carrier;
a housing in which the laser scanning member, the light detecting portion, and the scanning lens are disposed;
a temperature gradient detecting portion configured to detect a temperature gradient of the housing;
a heater configured to heat the image carrier or a sheet before image transferring; and
a correction processing portion configured to correct the emission start timing based on the temperature gradient detected by the temperature gradient detecting portion and a predetermined expression, and change a content of the predetermined expression based on an operation state of the heater at a start of an image formation process.

2. The image forming apparatus according to claim 1, wherein
in a case where the heater had been operated before the start of the image formation process, the correction processing portion changes the content of the predetermined expression so that a correction amount of the emission start timing becomes smaller than a case where the heater had not been operated.

3. The image forming apparatus according to claim 1, wherein
the temperature gradient detecting portion includes:
a first temperature detecting portion configured to detect a temperature of the scanning lens; and
a second temperature detecting portion configured to detect a temperature of the light detecting portion.

4. The image forming apparatus according to claim 3, wherein
the correction processing portion calculates a shift amount of the emission start timing based on a change of the temperature detected by the first temperature detecting portion, a difference between the temperatures detected by the first temperature detecting portion and the second temperature detecting portion, and an ambient temperature detected by an ambient temperature detecting portion, and corrects the emission start timing based on the shift amount.

5. The image forming apparatus according to claim 4, wherein
the correction processing portion calculates a shift amount d1 of the emission start timing based on a following equation (1), wherein T0 denotes a temperature detected by the first temperature detecting portion at a predetermined reference time, T1 denotes a current temperature detected by the first temperature detecting portion, T2 denotes a current temperature detected by the second temperature detecting portion, d1 denotes the shift amount of the emission start timing, and K1 and K2 denote predetermined coefficients:

$$d1 = K1*(T1-T2) + K2*(T1-T0) \qquad (1).$$

6. The image forming apparatus according to claim 5, wherein
a coefficient K11 and a coefficient K12 that is smaller than the coefficient K11 are set in advance, and a coefficient K21 and a coefficient K22 that is smaller than the coefficient K21 are set in advance, and
in a case where the heater had been operated before the start of the image formation process, the correction processing portion sets the coefficient K1 to the coefficient K11, and sets the coefficient K2 to the coefficient K12, and in a case where the heater had not been operated, the correction processing portion sets the coefficient K1 to the coefficient K21, and sets the coefficient K2 to the coefficient K22.

7. The image forming apparatus according to claim 3, comprising:
a plurality of image forming units;
a plurality of the scanning lenses corresponding to the plurality of image forming units; and a plurality of the light detecting portions corresponding to the plurality of image forming units, wherein the first temperature detecting portion detects a temperature of any of the plurality of the scanning lenses, the second temperature detecting portion detects a temperature of any of the plurality of light detecting portions, and the correction processing portion corrects the emission start timing in each of the plurality of image forming units based on the temperatures detected by the first temperature detecting portion and the second temperature detecting portion, and the expression.

8. The image forming apparatus according to claim 7, comprising:

two laser scanning devices including the scanning lenses that correspond to a plurality of image carriers, wherein the first temperature detecting portion is provided in one of the laser scanning devices, and the second temperature detecting portion is provided in the other of the laser scanning devices.

\* \* \* \* \*